(12) United States Patent
Pathania (10) Patent No.: US 12,348,968 B2
(45) Date of Patent: Jul. 1, 2025

(54) SYSTEMS AND METHODS FOR CELLULAR NETWORK SECURITY SLICING

(71) Applicant: DISH Wireless L.L.C., Littleton, CO (US)

(72) Inventor: Amit Pathania, Great Falls, VA (US)

(73) Assignee: DISH Wireless L.L.C., Littleton, CO (US)

( * ) Notice: Subject to any disclaimer, the term of this patent is extended or adjusted under 35 U.S.C. 154(b) by 349 days.

(21) Appl. No.: 17/965,386

(22) Filed: Oct. 13, 2022

(65) Prior Publication Data

US 2024/0129740 A1    Apr. 18, 2024

(51) Int. Cl.
*H04W 12/10* (2021.01)
*H04W 12/122* (2021.01)

(52) U.S. Cl.
CPC ......... *H04W 12/122* (2021.01); *H04W 12/10* (2013.01)

(58) Field of Classification Search
CPC .................................................. H04W 10/12
See application file for complete search history.

(56) References Cited

U.S. PATENT DOCUMENTS

| | | | | |
|---|---|---|---|---|
| 12,075,254 B1* | 8/2024 | Gupta | ................. | H04W 12/37 |
| 2010/0058456 A1* | 3/2010 | Jajodia | ................. | G06F 21/552 |
| | | | | 726/11 |
| 2017/0353490 A1 | 12/2017 | Krauss et al. | | |
| 2021/0105304 A1* | 4/2021 | Kraning | ................. | G06Q 10/08 |
| 2022/0217540 A1 | 7/2022 | Choyi et al. | | |

FOREIGN PATENT DOCUMENTS

WO    2021/091435 A1    5/2021

* cited by examiner

*Primary Examiner* — Michael T Vu
(74) *Attorney, Agent, or Firm* — Kilpatrick Townsend & Stockton LLP (57) ABSTRACT

Systems, methods, and machine-readable media facilitate cellular network security. Communications corresponding to requested network access from an external entity may be processed. Configuration specifications to instantiate network slices may be generated. The network slices may be instantiated in accordance with the configuration specifications with network access provided to user equipment of the external entity, the cellular network consequently providing the network access to the user equipment of the external entity. Signals corresponding to detection of a security event mapped to network traffic of the network slices of the cellular network may be identified. The network traffic may correspond to communications from some of the user equipment that are detected as malicious traffic. A first subset of the user equipment using the network slices to be compromised user equipment may be determined. The first subset of the user equipment or a second subset of the user equipment may be transitioned.

20 Claims, 4 Drawing Sheets

SYSTEMS AND METHODS FOR CELLULAR NETWORK SECURITY SLICING

TECHNICAL FIELD

This disclosure generally relates to wireless networks, and more particularly to systems and methods for cellular network security slicing.

BACKGROUND

Cybersecurity is an ever-increasing concern that extends to highly complex cellular networks including, for example, in 5G and future deployments, where dozens or hundreds of different software components may need to communicate and function in concert in order for the cellular network to function. Effectively handling and testing of attacks and intrusions may be challenging in complex cellular networks, particularly given the different types of attacks and intrusions. During a DDOS (distributed denial of service) attack, it may be one thing to identify and possibly block volumetric attacks, but it is difficult to identify low and slow DDOS attacks, where traffic is low volume and masquerades actual application traffic, rather than a constant stream of massive data requests. In any event, when devices are blocked, it is difficult to perform forensics on the cause.

Thus, there is a need for systems and methods that address the foregoing problems. This and other needs are addressed by the present disclosure.

BRIEF SUMMARY

Certain embodiments disclosed in the present disclosure relates to wireless networks, and more particularly to systems and methods for cellular network security slicing.

In one aspect, a method to facilitate cellular network security is disclosed. The method may include one or a combination of the following. A cellular network control system may receive one or more communications corresponding to requested network access from an external entity distinct from an entity operating a cellular network and the cellular network control system. The cellular network control system may generate configuration specifications to instantiate one or more network slices conforming to one or more network access parameters, one or more network entities, and/or one or more location identifiers. The cellular network control system may instantiate the one or more network slices in accordance with the configuration specifications with network access provided to user equipment of the external entity, the cellular network consequently providing the network access to the user equipment of the external entity. The cellular network control system may identify one or more signals corresponding to detection of a security event mapped to network traffic of the one or more network slices of the cellular network. The network traffic may correspond to one or more communications from some of the user equipment that are detected as malicious traffic. The cellular network control system may determine a first subset of the user equipment using the one or more network slices to be compromised user equipment based at least in part on the security event. The cellular network control system may transition the first subset of the user equipment or a second subset of the user equipment from the one or more network slices to one or more additional network slices. After the transitioning, one of the one or more network slices or the one or more additional network slices may correspond to one or more forensic slices that provide access to the first subset of the user equipment with an isolated environment that is isolated from the other of the network slices or the one or more additional network slices.

In another aspect, a system to facilitate cellular network security is disclosed. The system may include one or more processing devices and memory communicatively coupled with and readable by the one or more processing devices and having stored therein processor-readable instructions which, when executed by the one or more processing devices, cause the one or more processing devices to perform operations including one or a combination of the following. One or more communications corresponding to requested network access from an external entity distinct from an entity operating a cellular network and the system may be processed. Configuration specifications to instantiate one or more network slices conforming to one or more network access parameters, one or more network entities, and/or one or more location identifiers may be generated. The one or more network slices may be instantiated in accordance with the configuration specifications with network access provided to user equipment of the external entity, the cellular network consequently providing the network access to the user equipment of the external entity. One or more signals corresponding to detection of a security event mapped to network traffic of the one or more network slices of the cellular network may be identified. The network traffic may correspond to one or more communications from some of the user equipment that are detected as malicious traffic. A first subset of the user equipment using the one or more network slices to be compromised user equipment may be determined based at least in part on the security event. The first subset of the user equipment or a second subset of the user equipment may be transitioned from the one or more network slices to one or more additional network slices. After the transitioning, one of the one or more network slices or the one or more additional network slices may correspond to one or more forensic slices that provide access to the first subset of the user equipment with an isolated environment that is isolated from the other of the network slices or the one or more additional network slices.

In yet another aspect, one or more machine-readable storage devices for storing machine-executable instructions are disclosed. The machine-executable instructions, when executed by one or more processing devices, cause the one or more processing devices to perform one or a combination of the following operations. One or more communications corresponding to requested network access from an external entity distinct from an entity operating a cellular network and the one or more processing devices may be processed. Configuration specifications to instantiate one or more network slices conforming to one or more network access parameters, one or more network entities, and/or one or more location identifiers may be generated. The one or more network slices may be instantiated in accordance with the configuration specifications with network access provided to user equipment of the external entity, the cellular network consequently providing the network access to the user equipment of the external entity. One or more signals corresponding to detection of a security event mapped to network traffic of the one or more network slices of the cellular network may be identified. The network traffic may correspond to one or more communications from some of the user equipment that are detected as malicious traffic. A first subset of the user equipment using the one or more network slices to be compromised user equipment may be determined based at least in part on the security event. The first subset of the user equipment or a second subset of the user equipment may be transitioned from the one or more network slices to one or more additional network slices. After the transitioning, one of the one or more network slices or the one or more additional network slices may correspond to one or more forensic slices that provide access to the first subset of the user equipment with an isolated environment that is isolated from the other of the network slices or the one or more additional network slices.

In various embodiments, the one or more forensics slices may be controlled to allow the first subset of the user equipment to at least partially continue to operate within the isolated environment. In various embodiments, operational data may be collected from the one or more forensics slices over time. The operational data may correspond to observation data observed about operations of the first subset of the user equipment within the isolated environment. In various embodiments, the operational data from the one or more forensics slices may be analyzed to generate or change one or more models of the first subset of the user equipment and/or the second subset of the user equipment. In various embodiments, the operational data from the one or more forensics slices may be analyzed to generate or change one or more models of the security event. In various embodiments, the one or more additional network slices may be instantiated. In various embodiments, the instantiating of the one or more additional network slices may be responsive to the security event.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Disclosed embodiments according to the present disclosure may solve the above-mentioned problems. Disclosed embodiments may provide for independent, parallel, comprehensive, and accelerated security and analysis services disclosed herein. Disclosed embodiments may minimize the time required to address, analyze, and remediate security events with network slices.

Various embodiments will now be discussed in greater detail with reference to the accompanying figures, beginning with FIG. 1.

Figure 1:
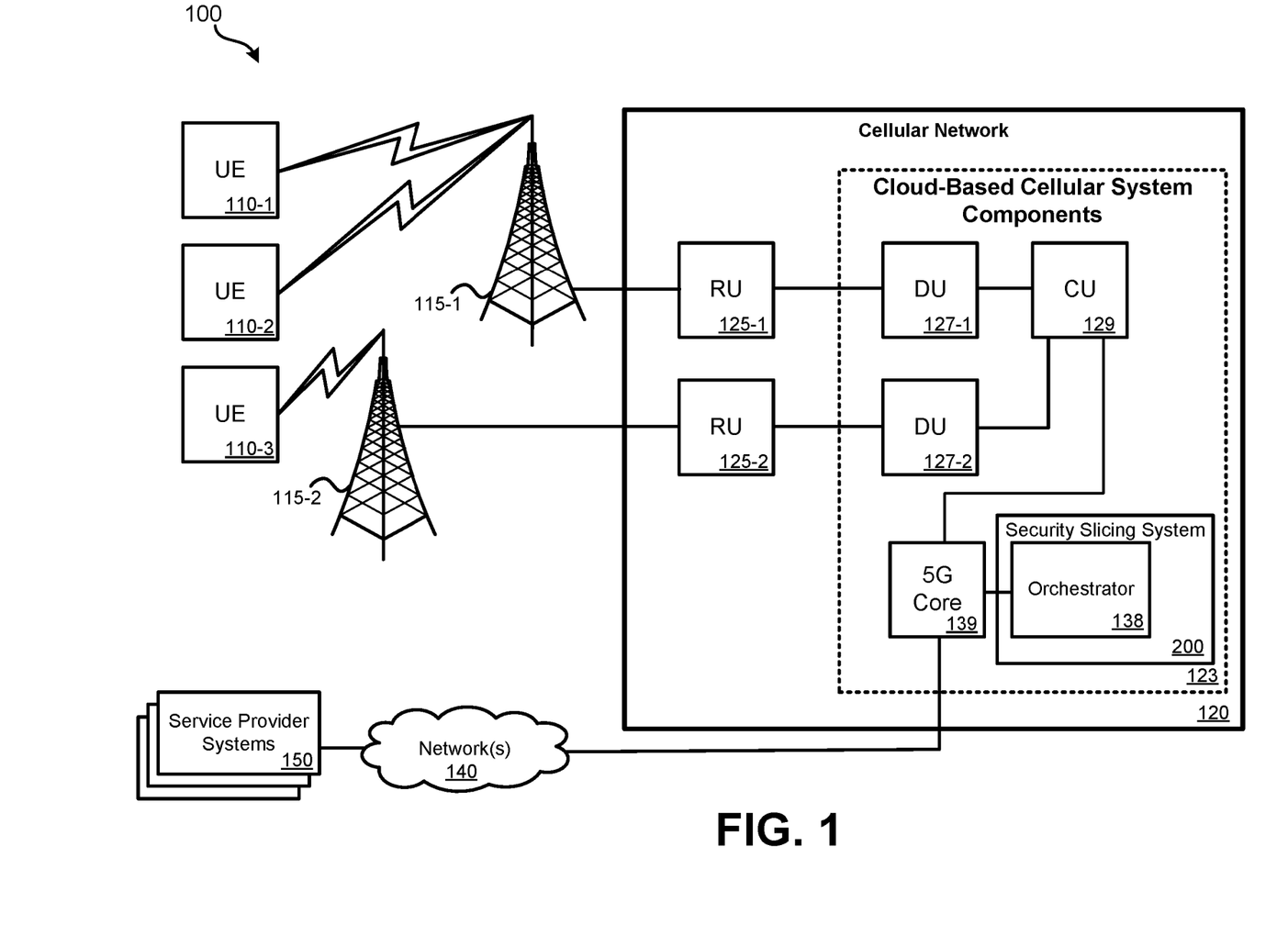
FIG. 1 illustrates an embodiment of a cellular network, in accordance with some example embodiments according to the present disclosure.

FIG. 1 illustrates an embodiment of a cellular network system 100 ("system 100"), in accordance with some example embodiments according to the present disclosure. System 100 may include a 5G New Radio (NR) cellular network; other types of cellular networks are also possible. System 100 may include: user equipment 110 (UE 110, UE 110-1, UE 110-2, UE 110-3); base station 115; cellular network 120 infrastructure including hardware, software, switches, routers, etc.; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components may be implemented as software in the cloud, except for components that need to receive and transmit RF, the functionality of the various components may be shifted among different servers to accommodate where the functionality of such components is needed.

UE 110 may represent various types of end-user devices, such as smartphones, cellular modems, cellular-enabled computerized devices, sensor or actuator devices, gaming devices, access points (APs), any computerized device capable of communicating via a cellular network, etc. Depending on the location of individual UEs, UE 110 may use RF to communicate with various base stations of cellular network 120. As illustrated, two base stations 115 (BS 115-1, 115-2) are illustrated. Real-world implementations of system 100 may include many (e.g., thousands) of base stations, RUs, DUs, and CUs. BS 115 may include one or more antennas that allow RUs 125 to communicate wirelessly with UEs 110. RUs 125 may represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture.

One or more RUs, such as RU 125-1, may communicate with DU 127-1. One or more DUs, such as DU 127-1, may communicate with CU 129. CU 129 may communicate with 5G core 139. The specific architecture of cellular network 120 may vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

5G core 139, which may be physically distributed across data centers or located at a central national data center (NDC), may perform various core functions of the network. 5G core 139 may include: authentication server function (AUSF); core access and mobility management function (AMF); data network (DN) which may provide access to various other networks; structured data storage network function (SDSF); and unstructured data storage network function (UDSF). While FIG. 1 illustrates various components of NDC and cellular network 120, it should be understood that other embodiments of cellular network 120 may vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components may be co-located or located at disparate physical server systems. For example, certain components of 5G core 139 may be co-located with components of CU 129.

In a possible O-RAN implementation, DUs 127, CU 129, 5G core 139, and orchestrator 138 may be implemented as software being executed by general-purpose computing equipment, such as in a data center. Therefore, depending on needs, the functionality of a DU, CU, and/or 5G core may be implemented locally to each other and/or specific functions of any given component may be performed by physically separated server systems (e.g., at different server farms). For example, some functions of a CU may be located at a same server facility as where the DU is executed, while other functions are executed at a separate server system.

Kubernetes, or some other container orchestration platform, may be used to create and destroy the logical DU, CU, 5G core units and subunits as needed for the cellular network 120 to function properly. Kubernetes may allow for container deployment, scaling, and management. As an example, if cellular traffic increases substantially in a region, an additional logical DU or components of a DU may be deployed in a data center near where the traffic is occurring without any new hardware being deployed. Rather, processing and storage capabilities of the data center would be devoted to the needed functions. When the need for the logical DU or subcomponents of the DU is no longer needed, Kubernetes may allow for removal of the logical DU.

The deployment, scaling, and management of such virtualized components may be managed by orchestrator 138. Orchestrator 138 may represent various software processes executed by underlying computer hardware. Orchestrator 138 may monitor cellular network 120 and determine the amount and location at which cellular network functions should be deployed to meet or attempt to meet service level agreements (SLAs) across slices of the cellular network.

Various embodiments may provide network slices, network services, or both. The network services provided may include VNFs (virtualized network functions), PNFs (physical network functions), and/or other network services. The VNFs may include software-based functions that may be utilized in conjunction with one or more slices such as security functions, monitoring functions, and/or the like. The PNFs may include hardware components of the cellular network which the cellular network control system 200, which may include orchestrator 138, may configure to provide a network slice and/or other network services to a particular client.

A network slice may correspond to a logical way of providing similar or different service to endpoints. A network slice may include one or more dedicated and/or shared functions that build up or otherwise facilitate a network service. So, for example, to provide data service, a network slice may be built up of multiple entities that authenticate the user and provide access over the air, and authenticate the user and provide a user plane to connect to the Internet. Another slice may be created which provides the same kind of service to a user, but with better download speeds and/or better upload speeds. Thus, while the same set of physical components may be used, the set of components can be broken down into slices.

A network slice may function as a virtual network operating on the cellular network 120. The cellular network 120 may be shared with some number of other network slices, such as hundreds or thousands of network slices. Communication bandwidth and computing resources of the underlying physical network may be reserved for individual network slices, thus allowing the individual network slices to reliably meet particular SLA levels and parameters. By controlling the location and amount of computing and communication resources allocated to a network slice, the SLA attributes for UE on the network slice may be varied on different slices. A network slice may be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 125-1 and DU 127-1, a second set of network slices, which may only partially overlap or may be wholly different than the first set, may be reserved at RU 125-2 and DU 127-2. Further, particular cellular networks slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and be able to properly respond to changes in the network. In order to ensure not only the functionality and interoperability of such components, but also the ability to respond to changing network conditions and the ability to meet or perform above vendor specifications, significant testing must be performed.

The cellular network 120 may include a security slicing system 200 (which may also be referenced herein as cellular network control system 200, control system 200, slicing system 200, or system 200). In various embodiments, the security slicing system 200 may correspond to one or a combination of one or more portions or all of the cellular network 120, one or more portions or all of the cloud-based cellular system components 123, and/or one or more portions or all of the orchestrator 138. In some embodiments, the security slicing system 200 may include the orchestrator 138.

Disclosed embodiments of the security slicing system 200 may provide for adaptive network slicing and system-intelligent load handling and features to facilitate handling and testing of attacks and intrusions. Disclosed embodiments of the security slicing system 200 may extend slicing to not just to provide a differentiated service to the endpoint, but also to protect from security attacks on the network. The system 200 may use slicing capability features disclosed herein to facilitate a multi-pronged solution that effectively handles, test, and learns attacks and intrusions. The solution may ensure that service is always provided to the uncompromised. UEs 110, while security events are addressed with the various features disclosed herein. Additionally, forensics operations and analyses may be performed so that the system 200 may learn to stop the attack, mitigate the damage from the attack, and/or prevent additional attacks (e.g., the same and/or similar attacks) from being successful in the future.

In some embodiments, specialized service systems 150 may communicate with the system 200 to facilitate security event detection, testing and forensic analyses, external data source provisioning to the system 200, and/or the like in accordance with embodiments disclosed herein via one or more networks 140, which may include the Internet. Additionally or alternatively, in various embodiments, one or more of the specialized service systems 150 may be internal to the cellular network 120 and/or may be included in the system 200. In some embodiments, the specialized service systems 150 may include one or more server systems that may interface with the system 200 and/or network 120 components. In some embodiments, the specialized service systems 150 may facilitate a DDOS detection system, an intrusion detection system, a scrubbing center, an inline machine-learning-based system, and/or the like.

Figure 2:
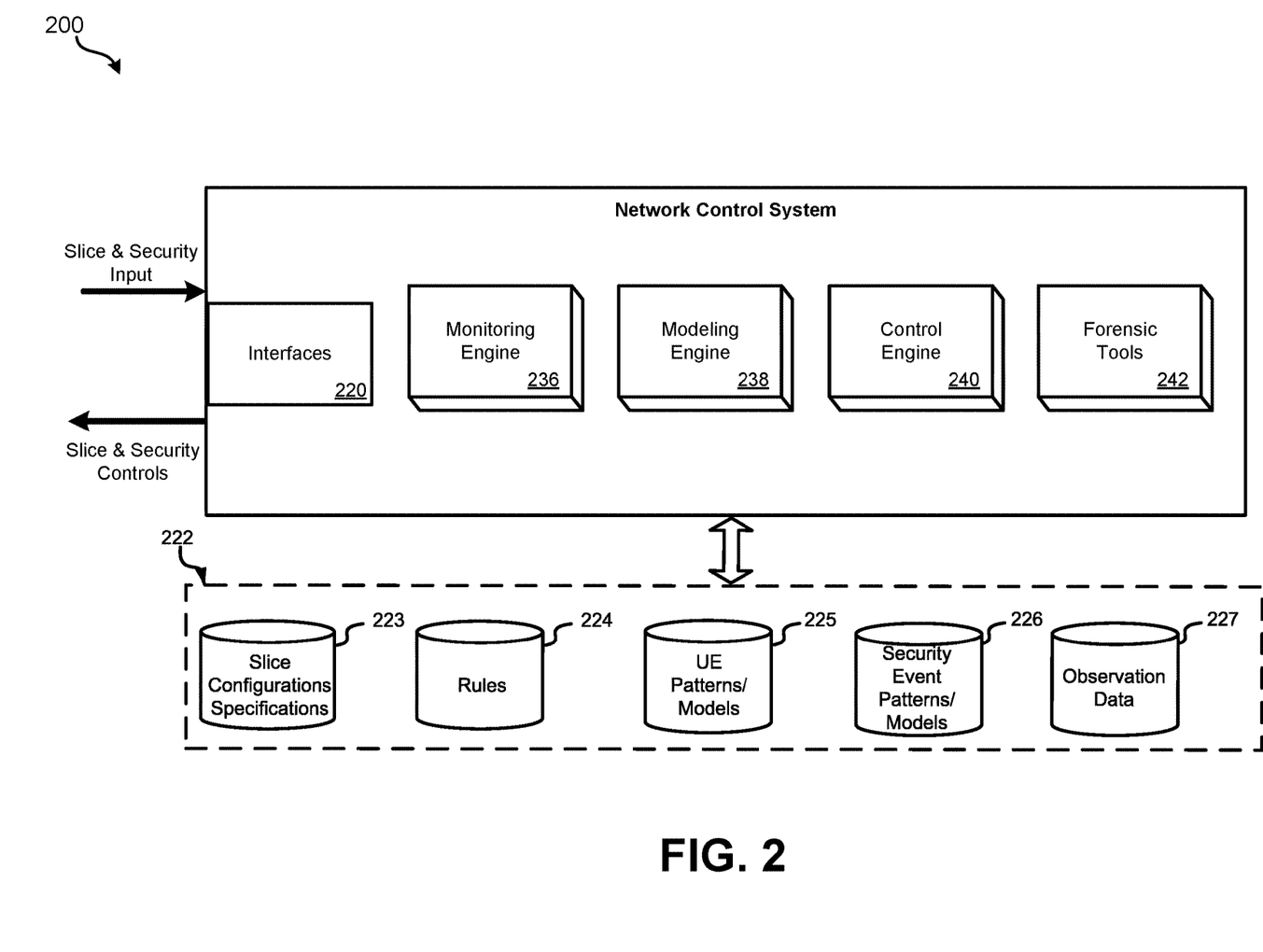
FIG. 2 illustrates the cellular network control system, in accordance with some example embodiments according to this disclosure.

FIG. 2 illustrates the cellular network control system 200, in accordance with some example embodiments according to this disclosure. For brevity, the cellular network control system 200 is depicted in a simplified and conceptual form, and may generally include more or fewer systems, devices, networks, and/or other components as desired. In various embodiments, the number and types of features or elements incorporated within the cellular network control system 200 may or may not be implementation-specific.

The system 200 may include special-purpose processors that are specifically designed, and physically and electrically configured, to perform the functions/operations detailed herein. The system 200 may include general-purpose processors may execute special-purpose software that is stored using one or more non-transitory, processor-readable mediums. The system 200 may interface with various systems and devices, including one or more client computing devices. In various embodiments, the system 200 may include a set of devices configured to process, transform, encode, translate, send, receive, retrieve, detect, generate, compute, organize, categorize, qualify, store, display, present, handle, or use information and/or data suitable for the embodiments described herein. For example, servers of the system 200 may be used to store software programs and data. Software implementing the systems and methods described herein may be stored on non-transitory storage media in the servers. Thus, the software may be run from the storage media in the servers. In some embodiments, software implementing the systems and methods described herein may be stored on storage media of other devices described herein. The system 200 may be implemented in or with a distributed computing and/or cloud computing environment with a plurality of servers and cloud-implemented resources by which services may be offered as cloud services. The system 200 may include processing resources communicatively coupled to storage media, random access memory (RAM), read-only memory (ROM), and/or other types of memory. The domain proxy control system 101 may include various input and output (I/O) devices, network ports, and display devices. Some embodiments of the domain proxy control system 101 may facilitate searching of one or more information repositories in response to data received over the one or more networks 120 from any one or combination of the interfaces.

In various embodiments, the system 200 may be composed of one or more specialized computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, the system 200 may be adapted to run one or more services described herein. The system 200 may run an operating system, which may correspond to a server operating system. The system 200 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those available from AWS, Oracle, Microsoft, Sybase, IBM (International Business Machines), and the like.

The system 200 may include one or more system coordination servers. The system coordination servers may include any suitable type of server including, for example, a rack server, a tower server, a miniature server, a blade server, a mini rack server, a mobile server, an ultra-dense server, a super server, or the like, and may include various hardware components, for example, a motherboard, processing units, memory systems, hard drives, network interfaces, power supplies, etc. System coordination servers may include one or more server farms, clusters, or any other appropriate arrangement and/or combination or computer servers. System coordination servers may operate according to stored instructions located in a memory subsystem of the servers, and may run an operating system, including any suitable server operating system and/or any other operating systems discussed herein.

Data storage 222 of the system 200 may include one or more data storage servers, which may include file-based storage systems, block storage systems, and/or cloud object storage systems. Data storages may comprise stored data germane to the functions of the system 200. Illustrative examples of data storages that may be maintained in certain embodiments of the network are described below. In some embodiments, multiple data storages may reside on a single server, either using the same storage components of the server or using different physical storage components to assure data security and integrity between data storages. In other embodiments, each data storage may have a separate dedicated data storage server.

The system 200 may include one or more interfaces 220, that may include one or a combination of an on-prem interface, a CI/CD interface, a cloud interface, a data interface, a data center interface, a network controller phase, and operations interface, and/or the like configured to receive and/or transmit communications such as slice insecurity input and controls to facilitate various embodiments disclosed herein. In various embodiments, the interfaces 220 may be separated or a combination of interfaces 220 may be integrated. The system 200 may receive one or more source requests corresponding to a slice request and/or services from a client via one or more of the interfaces 220. Thus, one or more of the interfaces 220 may correspond to a client interface that may serve to receive requests from client devices.

The system 200 may include a monitoring engine 236, a modeling engine 238, and a control engine 240. The monitoring engine 236 and the modeling engine 238 may be configured to perform the monitoring features and modeling features disclosed herein. In various embodiments, the control engine 240 may include or otherwise correspond to one or a combination of a network service orchestration engine, a network service catalog, a service and slice designer, a slice parameter creator, a slice configurer, and an instantiation engine, among other components, configured to instantiate network slices and network services, configure cloud-native network functions (CNFs), control transitioning of UEs 110, control forensic tools 242, and facilitate other network security slicing features disclosed herein. For example, the control engine 240 may be configured to instantiate parallel forensic slices and provide access to real-time or near-real-time replicas of any or all of the cellular network equipment of compromised slices as disclosed herein. The system 200 may create slices for particular security measures for particular security events on particular slices as disclosed herein. The system 200 may provide for any number of slices available in the network of networks, existing for the duration needed. Each slice may be specified to have at least a portion of the underlying network but may be modified with exceptions as disclosed herein.

The control engine 240 may correspond to the orchestrator 138 in some embodiments. The control engine 240 may be configured to provide intelligence for the overall system 200. The control engine 240 may include one or more processing devices configured to intelligently orchestrate features of the system 200, may trigger the CI/CD pipelines, may cause instantiation of and may control environments, may cause instantiation of and may control slices, may cause and control UE transitions, may cause and control forensic tool analyses, among other things. For example, responsive to a detection of a security event, the control engine 240 may trigger creation of one or more forensic slices 120-2 and may provide a set of slice specifications 223 for the one or more forensic slices in accordance with rules 224. The slice configurer of the control engine 240 may parse the set of slice specifications into configuration specifications 223 that specify the configurations of (as illustrated, for example, in FIG. 4) one or more RUs 125, one or more DU slices 127, a CU slice 129, components of the 5G core slice 139 and/or the like. The slice parameter creator of the control engine 240 may identify the parameters for instantiation of the slice and may issue instructions to create the instantiation of the one or more RUs 125, the one or more DU slices 127, the CU slice 129, the components of the 5G core slice 139, and/or the like in accordance with the parameters.

In some embodiments, the modeling engine 238 may include forensic tools 242 to analyze UE 110 operations and attack characteristics as disclosed further herein. The modeling engine 238 may be configured to provide forensic tool 242 automation to automate the execution of the forensic tools 242 and capture of results from the execution of the forensic tools 242. In some embodiments, the control engine 240 may control or otherwise cause forensic tools 242 to analyze UE 110 operations and attacks, and, in some embodiments, the forensic tools 242 may be external to the system 200 and may, for example, be provided by one or more specialized service systems 150 in some embodiments. In some embodiments, the system 200 may allow specialized service systems 150 to access the forensic slices disclosed herein to apply the data-gathering and forensic analysis tools 242 to the forensic slices and the UEs 110 assigned thereto.

The storage system 222 may include a software repository 223 may store all slice configuration specifications, which may include NFs (network functions) and, the functions and configurations of the radio network as software, the functions and configurations of the 5G Core as software, the functions and configurations of the cloud-based cellular system components and replicas thereof. The system 200 may facilitate deployment in sandbox environments to facilitate security measures as disclosed further herein. All NFs deployed in all environments may be done via CI/CD (continuous integration and continuous deployment) pipelines and processes.

Figure 3:
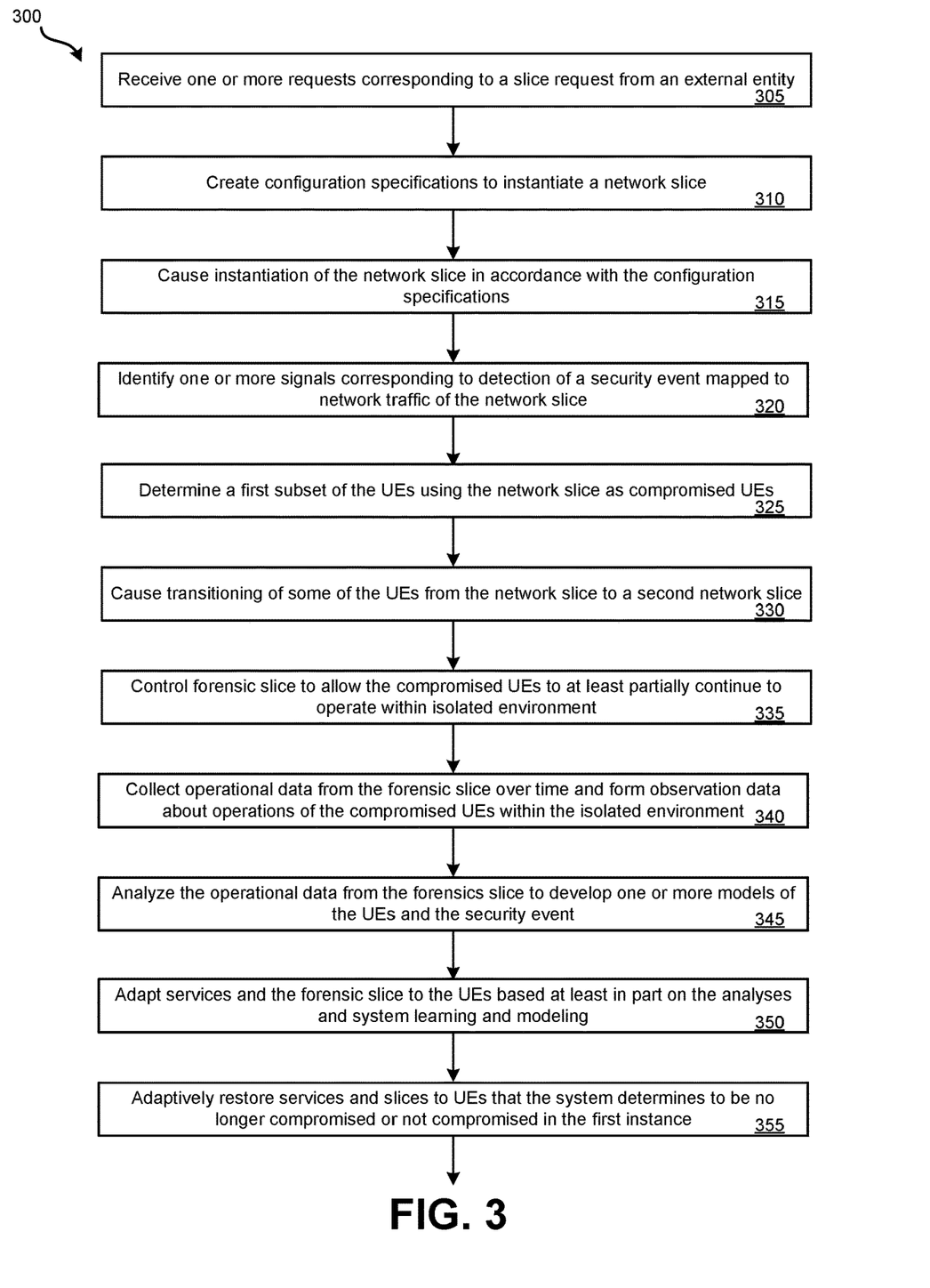
FIG. 3 illustrates an embodiment of a method for certain features directed to facilitating cellular network slice security in accordance with some example embodiments according to the present disclosure.

Various methods may be performed by the system 200. FIG. 3 illustrates an embodiment of a method 300 for certain features directed to facilitating cellular network slice security in accordance with some example embodiments according to the present disclosure. However, teachings of the present disclosure may be implemented in a variety of configurations. As such, the order of the steps comprising the method 200 and/or other methods, processes, and operations disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 305, the system 200 may receive one or more requests corresponding to a slice request from an external entity distinct from an entity operating the network 120 and the system 200. As indicated by block 310, the system 200 may create configuration specifications to instantiate a network slice. The network slice may, for example, conform to one or more network access parameters, one or more quality of service parameters, one or more network services, one or more network entities (e.g., one or more of a radio, digital unit, control unit (RAN entities), a core function, and/or a security function) and/or one or more service location identifiers. As indicated by block 315, the system 200 may cause instantiation of the network slice in accordance with the configuration specifications. The instantiation of the network slice may include network services provided to UEs 110 of the external entity, with the network 120 consequently providing the network services to the UEs 110.

A security event may be detected. As indicated by block 320, the system 200 may identify one or more signals corresponding to detection of a security event mapped to network traffic of the network slice, where the network traffic corresponds to one or more communications from some of the UEs 110. The security event may correspond to one or a combination of a DDOS attack, an intrusion into parts of the network that the user is not authorized to access (e.g., unauthorized access of a UDM (unified data management)/UDR (unified data repository) system component, unauthorized data access, etc.), access of a day-zero vulnerability that was previously unknown, unauthorized operations (e.g., a user self-authorizing for additional services, unauthorized changing of access rights, etc.), and/or the like. The system 200 may be configured to monitor the network slices allocated to the UEs 110 for any malicious traffic, including DDOS attack vectors. In some embodiments, the system 200 may use the monitoring engine 236 configured to monitor the network slices and/or input/communications from other monitoring components, applications, and/or systems for any suitable aspects to facilitate improvements with features disclosed herein. The monitoring engine 236 may aggregate, process, and consolidate monitored input/communications to facilitate creation, development, and/or use of UE profiles/patterns 225, attack profiles/patterns 226, observation data 227, and/or the like. The system 200 may include or be otherwise communicatively coupled to one or more systems executing one or more applications that continuously monitor network traffic to detect and capture any malicious traffic sent by the UEs 110. In various embodiments, the one or more systems may include a DDOS detection system, an intrusion detection system, a scrubbing center, an inline machine-learning-based system, and/or the like Detection of the security event may be based at least in part on system-recognition of a violation of one or more access rules; system-detection of one or more operations being executed without one or more conditional values being met; operational patterns matching one or more vector patterns, operational volumetric, speed, and/or frequency thresholds; and/or the like. The detected operations may be matched to one or more patterns, models, criteria, and/or the like (e.g., of the attack profiles/patterns 226) to identify the detected operations as malicious traffic.

As indicated by block 325, the system 200 may determine a first subset of the UEs 110 using the network slice as compromised UEs 110 based at least in part on the security event. Likewise, the system 200 may determine a second subset of the UEs 110 using the network slice as uncompromised/legitimate based at least in part on the security event. For example, the detected operations may be mapped to particular UEs 110 to identify the particular UEs 110 as compromised UEs 110. Each of the compromised UEs 110 may be designated as compromised, for example, by way of an attribute, identifier, flag, tag, value, field, specification, and/or the like the mapped to specifications for the UE 110 that may be stored in the UE profiles 225. Likewise, each of the uncompromised UEs 110 may be designated as uncompromised in a similar manner.

In various embodiments, the system 200 may use the modeling engine 238 configured to perform one or a combination of the matching, modeling, learning, reasoning, and/or the like analyses features disclosed herein. The modeling engine 238 may be an analysis and matching engine that employs machine learning to process the monitored input and/or observation data 227 disclosed herein (e.g., which may be received from the monitoring engine 236 in some embodiments), and/or data based at least in part thereon and develop the observation data 227, profiles, patterns, and/or models 225, 226. The modeling engine 236 may include or otherwise correspond to a learning engine that may employ an ongoing learning mode to create, update, confirm, correct, and/or refine the observation data 227, profiles, patterns, and/or models 225, 226. The modeling engine 236 may include a pattern-based reasoner that may be employed to use various statistical techniques in analyzing the data, both current and historical, in order to infer particularized pattern and/or model data (e.g., UE operational patterns, particularized attack patterns, compromised service patterns, and/or the like) from the data. A transitive reasoner may be employed to infer relationships from a set of relationships to form the particularized pattern and/or model data. In various embodiments, the system 200 may automatically establish and develop the particularized pattern data. In some embodiments, the modeling engine 236 may be configured to employ deep learning to process the data and derive the particularized pattern and/or model data.

In various embodiments, the system 200 may analyze operational data monitored and collected with respect to the compromised UEs 110 and the other UEs 110. Such analyses may be performed with respect to the original slice, as well as the forensic slice, throughout the processes disclosed herein as ongoing security features prior to, during, and after security events. In some examples, the system 200 may analyze the operational data from the original slice to create or develop pattern and/or model data 225, 226 with respect to the compromised UEs 110, the other UEs 110, the services, the attacks, and/or the like. Likewise, in some examples, the system 200 may analyze the forensic slice data from the forensic slice (and, in some cases, the other slices) to create or develop one or more models 225, 226 of the compromised UEs 110 operations, the legitimate UEs 110 operations, the metrics of the particularized attack, the compromise and uncompromised services, and/or the like. The models 225, 226 may be particularized to the particular UEs 110, cohorts, services, attacks, and/or the like and refined with further data collected and analyzed, as further disclosed herein.

The system 200 may store specifications for each of the UEs 110 in any suitable manner, including, for example, in profiles and/or models 225 particularized to each UE 110. In some instances, the system 200 may link, map, cross-reference, and/or otherwise associate profiles and/or models 225 particularized to each UE 110 with each other when the system 200 recognizes multiple compromised UEs 110 as correlated to one another based at least in part on common specifications of the UEs 110, detection of being associated with the same security event, recognition of malicious traffic operations where the UEs 100 operate in concert/cooperatively to effect an attack, and/or the like. The system 200 may store specifications for recognized cohorts of compromised UEs 110 in any suitable manner, including, for example, in profiles and/or models 225 particularized to the cohorts of compromised UEs 110. Thus, various embodiments of the system 200 may identify an attack and detect that a slice has compromised UEs 110.

As indicated by block 330, the system 200 may cause transitioning of some of the UEs 110, either the compromised UEs 110 or the uncompromised UEs 110 in various instances, from the network slice to a second network slice. By way of example, some embodiments may use a method to silently move the compromised UEs 110 to the forensic slice. The monitoring engine 236, the modeling engine 238, and/or the control engine 240, having performed the required analyses and having categorized a particular UE 110 as compromised, may send identification information to the orchestrator 138. The identification information may include internal UE IDs and bearer IDs stored in radio network elements and core network elements. The identification information may also include new IDs assigned by the system 200 as part of a categorization process.

The orchestrator 138 may create one or more message payloads, implementation policy, and corresponding automation which may include one or more of the following to be applied to the UEs 110 that were categorized as compromised: configuration parameters for the forensic slice; specific procedures; new quality of service parameters to be used in radio network, core network or transport network; new radio resource management configurations that may change the configuration for one or more communication protocol layers, physical layer control, medium access control, link control, and data management protocols; list of one or more shared or dedicated RAN or core functions assigned to the forensic slice; new networking interfaces and ports, internet protocols, VLANs, firewall rules or security protocols; and/or special headers, markers or identifiers inserted in the data transmitted by and/or related to the compromised UE 110.

The orchestrator 138 may send the messages to the radio, core, and transport network components to apply the new configurations and procedures, which may: assign the forensic slice ID to the UE, or internally map the existing slice ID for this particular UE to the forensic slice ID; modify the handling of control and signaling communication between UE's communication system and one or more of radio network components and core network components; change the values of internal timers related to call processing or call management; change the number or behavior of traffic bearing channels; and/or change the previously communicated signaling and control configuration between the UE and the network, or send an additional signaling and control configuration. The orchestrator 138 may also choose to apply specific policies, which govern a particular combination of configurations and procedures, based on the threat level posed by the compromised UEs 110. In a similar manner, some embodiments may use the method to silently move the uncompromised UEs 110 to another slice and away from the forensic slice.

After the transitioning of some of the UEs 110, either the compromised UEs 110 or the uncompromised UEs 110, from the original network slice to the second network slice, one of the original network slice or the second network slice may correspond to a forensic slice that provides services to the compromised UEs 110 with an isolated environment that is isolated from the other network slice and the rest of the network 120. As indicated by block 335, the system 200 may control the forensic slice to allow the compromised UEs 110 to at least partially continue to operate within the isolated environment.

Figure 4:
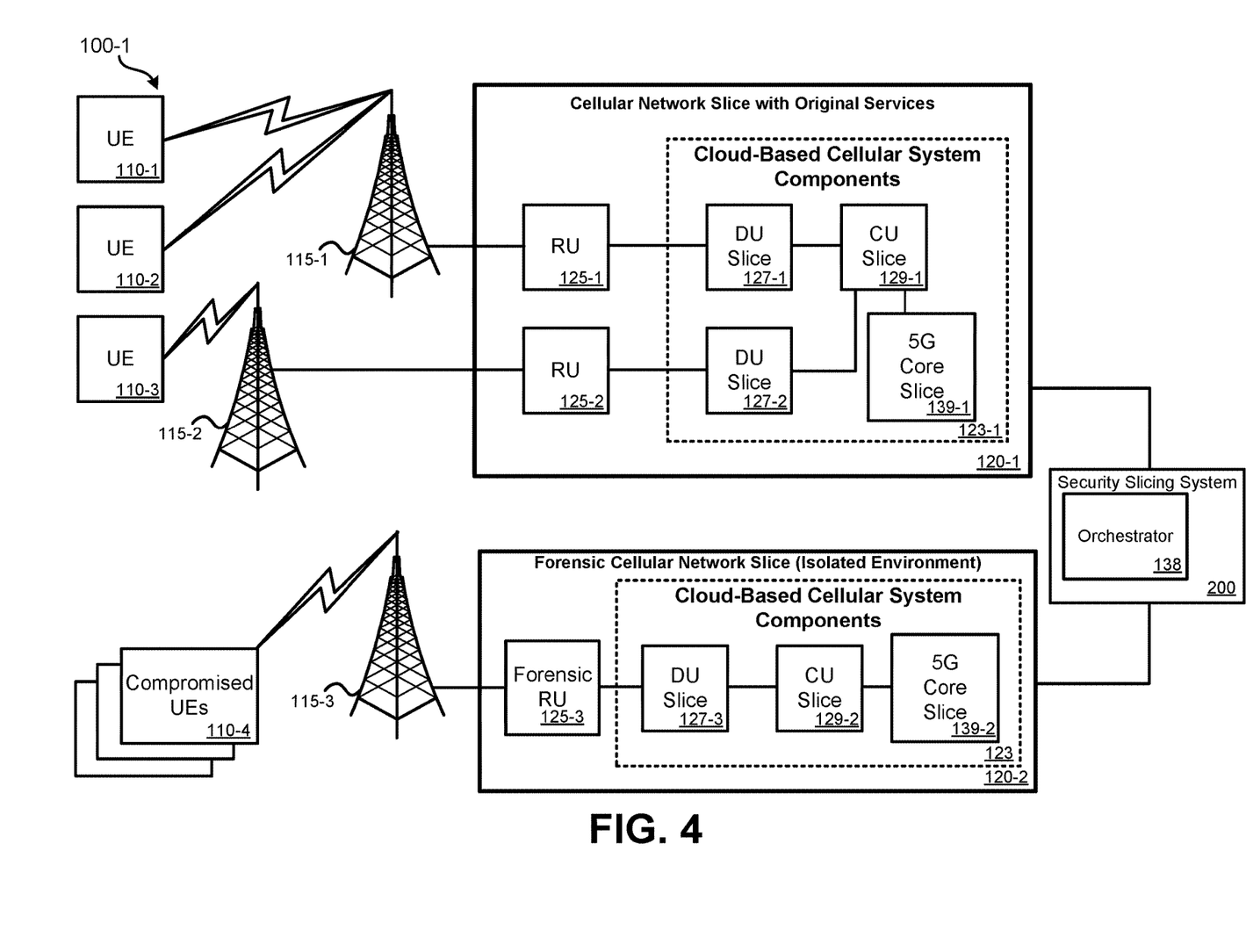
FIG. 4 illustrates a transitioned state where compromised (user equipment) UEs have been transitioned to a forensic slice that provides services to the compromised UEs with an isolated environment that is isolated from the other network slice and the rest of the network, in accordance with some example embodiments according to the present disclosure.

By way of example, FIG. 4 illustrates a transitioned state where compromised UEs 110-4 have been transitioned to a forensic slice 120-2 that provides services to the compromised UEs 110-4 with an isolated environment that is isolated from the other network slice and the rest of the network 120, in accordance with some example embodiments according to the present disclosure. Accordingly, disclosed embodiments of the system 200 may intelligently create and use forensic slices 120-2 of the network 120 to improve network security. When an attack is detected or suspected (e.g., based at least in part on traffic vectors matched to malicious traffic trend pattern references) on a slice, UEs 110 that are not part of the attack can be moved to a different slice 120-1 so that they are not affected by the attack, thereby limiting the effect of the attack on the legitimate UEs 110. UEs 110 which may be part of the attack may be maintained on that slice 120-2, which may be converted to a forensic slice 120-2 which terminates in a forensic center (which could be included in and/or routed to by the system 200 in various embodiments) for diagnostic and root-cause analyses. Legitimate traffic detected here can be sent to the other slice until only UEs 110 which are part of the attack are left. This limits the effect of the attack on the network 120, while still allowing the system 200 to investigate the attack (which would not possible if the traffic is just blocked) to improve security in real time with feedback loops or otherwise. Additionally or alternatively, the system 200 may move UEs 110 that are part of the attack to a different slice 120-2, while maintaining the legitimate UEs 110 on their original slice 120-1, as disclosed further herein.

Say, for example, slice A is in operation, and there are many UEs 110, and a security event is initiated (e.g., by one or more of the UEs 110 or one or more other components of the system 100). For example, out of the many UEs 110, a subset of the UEs 110 may be compromised, and may start a coordinated DDOS attack. The coordinated DDOS attack may include the subset of the UEs 110 sending messages to overwhelm components that are in slice A (e.g., one or more systems/servers serving slice A). However, there are other UEs 110 that are not compromised and that are still using slice A. If slice A is allowed to undergo the attack, then the service to all the UEs 110 will be disrupted. If slice A is brought down to protect other slices from propagation of the DDOS from slice A to any other slices, then, again, service is disrupted for all UEs 110, both legitimate UEs 110 and compromised UEs 110. Rather than shutting down access and/or services for all UEs 110 allocated to a slice, the system 200 may intelligently limit the effect of the attack while maintaining active service for the legitimate UEs 110.

The system 200 may detect the UEs 110 that are using slice A and that are not compromised. Accordingly, the system 200 may differentiate between compromised and uncompromised/legitimate UEs 110 mapped to the slice A. The system 200 may designate each of the differentiated UEs 110 as compromised or not compromised, for example, by way of an attribute, identifier, flag, tag, value, field, specification, and/or the like the mapped to specifications 225 for the UE 110, which the system 200 may use for the diversion and segregation operations to isolate the compromised UEs 110 from other parts of the network 120, including the uncompromised UEs 110.

In some embodiments, the system 200 may differentiate and designate the UEs 110 with more finely-grained recognition than only determining whether the UEs 110 are compromised or not compromised to account for varying degrees of certainty with regard to whether a UE 110 and/or operations of the UE 110 are malicious. Observation data 227 of the detected operations of UEs 110 may be consolidated and processed to yield a threat score. Any one or combination of types of observation data 227 of the detected operations of UEs 110 may be captured and qualified, including one or a combination of operations that violate or more access rules; operations being executed without one or more conditional values being met; operational patterns matching one or more vector patterns, operational volumetric, speed, and/or frequency thresholds; operations that match operations of one or more other system-recognized compromised UEs 110; communications, links, references, bridges, or other associations with one or more other system-recognized compromised UEs 110; use of one or more compromised services within a particular time period; access of one or more compromised ports, one or more malicious links, sites, files, applications, memory sectors, etc.; execution and/or sharing of one or more malicious files, applications, code, etc.; and/or the like. The system 200, using the modeling engine 238 and the observation data 227, may model the particular attack to facilitate determining a signature (e.g., a threat signature) of compromised UEs 110 (e.g., these five messages, operations, etc. having these four attributes/qualifications of rule violations, conditions, patterns, threshold triggers, accesses, communications, etc.).

Some embodiments may qualify a UE 110 according to a graduated threat scale, which could employ one or more thresholds in various embodiments. Any suitable threat scale may be used in various embodiments. In some embodiments, a threat scale could entail a categorization scheme, with categories such as a particular UE 110 recognized as a strong threat mapped endpoint (e.g., with a full match of the threat signature), a particular UE 110 recognized as a possible threat (e.g., with a substantial match of the threat signature), weak recognition of particular UE 110 as a threat (e.g., with a partial/minimal match of the threat signature), and no threat recognize for a particular UE 110 (e.g., with zero match of the threat signature), or any suitable categories such as other categories disclosed herein.

In disclosed embodiments, a threat scale could entail a threat scoring system. The authentication scoring system could be correlated to the category scheme in some embodiments, such that certain scores correspond to certain categories. Some embodiments may score system-recognition of a possible threat mapped to a particular UE 110 and/or operations thereof with a numerical expression, for example, a threat score. For example, in some embodiments, a threat score may be an assessment of a certainty with which the system identifies a potential threat posed by a particular UE 110 and/or operations thereof, characterizes integrity of the UE 110, and/or authenticates the UE 110, taking into account a number of factors, each of which may be weighted differently. By way of example without limitation, a threat scale could include a range of scores from 0 to 100, or from 0 to 1,000, with the high end of the scale indicating greater probability. Some embodiments may use methods of statistical analysis to derive a threat score. Various embodiments may determine a score based on any one or more suitable quantifiers. A threat score may be based at least in part on the extent to which detected characteristics of the captured data match previously determined characteristics of patterns, models, criteria, and/or the like identified for threats. In some embodiments, a score may be cumulative of individual scores based on matching each type of the characteristics.

With a threat score determined, categorizations may be made based on the score. By way of example without limitation, a score correlated to a 75-100% band may be deemed a positive identification of a threat; a score correlated to a 70-75% band may be deemed a likely identification of a threat with some indicia of questionable operational attributes; a score correlated to a 25-50% band may be deemed a weak identification of a threat with more indicia of questionable or suspicious operational attributes; a score below a 25% minimum threshold may be deemed a weak/insufficient identification of a threat; and a score of zero may correspond to no threat and a legitimate UE 110.

Consequent to detecting a threat, the system 200 may identify, create or otherwise initiate one or more additional slices in various embodiments (e.g., either slice 120-1 or slice 120-2 may correspond to one such additional slice). In some embodiments, the one or more additional slices may have already been created and/or otherwise initiated. In such embodiments, the one or more additional slices, though created, may be controlled to not provide services to anything or any user until a security event is detected. In any case, the one or more additional slices may include a slice B, for example. So there is a slice A and a slice B, which may respectively correspond to either slice 120-1 and slice 120-2, or vice versa in various instances and embodiments).

The system 200 may designate one of the slices as a forensic slice 120-2, for example, by way of an attribute, identifier, flag, tag, value, field, specification, and/or the like the mapped to specifications 223 for the slice. In some embodiments, the forensic slice 120-2 may be one of the one or more additional slices, for example, slice B. For example, the slice B may be initiated for only the selected UEs 110-4 using slice A that are compromised. Thus, the compromised UEs 110-4 may be moved over to the new forensic slice 120-2. The uncompromised UEs 110 may be kept on the existing slice A, and the system 200 may associate data-gathering and forensic tools 242 with the second slice B and use that slice B for forensic operations and analyses.

However, in some embodiments, the forensic slice 120-2 may be slice A. For example, the slice B may be for only the selected UEs 110 using slice A that are not compromised. Thus, the uncompromised UEs 110-4 may be moved over to the new forensic slice 120-2. The compromised UEs 110-4 may be kept on the existing slice A, and the system 200 may associate data-gathering and forensic tools 242 with the first slice A and use that slice A for forensic operations and analyses. Accordingly, various embodiments may designate either slice as a forensic slice 120-2.

In some embodiments, the determination of whether to convert the original slice into a forensic slice 120-2 or to instantiate another slice as a forensic slice 120-2 may be set by predetermined specification, such as a client specification. However, in some embodiments, the system 200 may dynamically determine whether to convert the original slice into a forensic slice 120-2 or to instantiate another slice as a forensic slice 120-2 based at least in part on a set of rules 224 and a set of parameters. For example, the system 200 may make the determinations in part on the extent to which UEs 110 are compromised. If the number of compromised UEs 110 from the original slice satisfies a particular threshold (e.g., greater than 50% of the UEs 110 assigned to the slice, at least amounting to a minimum number of UEs 110, or any suitable threshold), the system 200 may keep the compromised UEs 110-4 on the original slice and convert it to a forensic slice 120-2, while transitioning the other UEs 110 to a another slice. If the system 200 determines that the number of compromised UEs 110-4 from the original slice does not satisfy a particular threshold, the system 200 may transition the compromised UEs 110-4 to another slice that corresponds to the forensic slice 120-2, while keeping the other UEs 110 with the original slice.

Additionally or alternatively, the system 200 may take into account prediction of migration time to migrate UEs 110 to another slice. The system 200 may model (e.g., using the modeling engine 238) the migration of the compromised UEs 110-4 to another slice and the migration of the other UEs 110 to another slice and make compare the corresponding predicted migration times of each scenario. The predicted migration times determined by the modeling may be a function of the numbers of UEs 110, the services and configuration 223 of the slices (including the numbers of nodes and other configuration specifications), the resources available to the system 200 at the time, historical migration times collected by the system 200 for migration scenarios of UEs 110 and slices that the system 200 determines to match the particular UEs 110 and slice configuration of the current slice state, and/or the like. If the system 200 determines that the predicted migration time to migrate the uncompromised UEs 110 from the original slice to another slice is greater than a particular threshold (e.g., X seconds, minutes, etc.), the system 200 may determine to migrate the compromised UEs 110-4 to a forensic slice 120-2 and keep the other UEs 110 on the original slice. If the system 200 determines that the predicted migration time to migrate the uncompromised UEs 110 from the original slice to another slice is less than the particular threshold, the system 200 may determine to migrate the uncompromised UEs 110 to another slice and keep the compromised UEs 110-4 on the original slice, which will be converted to a forensic slice 120-2. The threshold may correspond to an acceptable maximum outage time, which may be system-determined and/or specified by one or more clients in various embodiments. The system 200 may keep the forensic slice 120-2 active in order to observe data about what the compromised UEs 110-4 are attempting to do.

As indicated by block 340 of FIG. 3, the system 200 may collect operational data from the forensic slice 120-2 over time, the operational data corresponding to observation data 227 observed by the system 200 about operations of the compromised UEs 110-4 within the isolated environment. As indicated by block 345, the system 200 may analyze the operational data from the forensic slice to create or develop one or more models 226 of the compromised UEs 110-4, the other UEs 110, and/or the security event. As indicated by block 350, the system 200 may adapt services and the forensic slice to the UEs 110-4 based at least in part on the analyses and system learning and modeling. As disclosed herein, this may include the system 200 intelligently selecting services for access by the UEs 110-4 in an iterative or otherwise staging process as the forensic tools and analyses 242 are applied. Further, this may include the system 200 intelligently staging UEs 110 with two or more slices as the system 200 continues to learn about the threat and the UEs 110. As indicated by block 355, the system 200 may adaptively restore services and slices to UEs 110 that the system 200 determines to be no longer compromised or not compromised in the first instance. Again, this may include the system 200 intelligently restoring services and transitioning the UEs 110 to slices in an iterative, or otherwise staging process.

Accordingly, upon initial determination of compromised UEs 110-4, the system 200 may sandbox the compromised UEs 110-4 into an area where the data may be safely collected. The system 200 may keep the forensic slice 120-2 completely and/or virtually isolated and/or air-gapped. The system 200 may ensure that servers, applications, and other components of the forensic slice 120-2 made never shared with any other slices of the network 120 and do not connect to any other slices of the network 120 so that there is no chance of corruption/vulnerability propagating to the rest of the slices. The IP addresses of the servers, applications, and other components may be configured to be static. The routes may be configured to be fixed. The routers and switches may be dedicated. The storage locations may be completely isolated. In some embodiments, the forensic slice 120-2 may terminate into a security operations center, which may correspond to a forensic lab system environment in some embodiments. For example, the forensic lab system environment may include one or more computers that are pseudo-air-gapped computers that are not connected to anything else in the network 120 and that are only connected to the forensic slice 120-2. So, for example, from a particular UE 110 to the server of the forensic lab system environment, there may be six nodes (e.g., routers, switches, servers, entities, and/or the like) only serving the specific slice. Once the UE 110 gets assigned to the forensic slice 120-2 and sends its traffic, the traffic may travel a deterministic route that never crosses into any other route. The route may be completely isolated, connecting those nodes, but those nodes can only be reached through the one slice. Additionally or alternatively, the system 200 may create a VLAN so the attack never propagates laterally into the network 120. It may stay on the same path. The system 200 may use virtual routers and routes, but those routes may be fixed so they do not change.

The system 200 may increase efficiency of allocation of resources as a function of security events and time. Having filtered legitimate UEs 110 from illegitimate UEs 110-4 and/or vice versa, disclosed embodiments need not waste resources (CPU, memory, storage, TOPS resources) applying data-gathering and forensic tools to those UEs 110 that are determined to be not compromised and allocate more resources to the enforcement, analyses, and learning operations with respect to the isolated, compromised UEs 110-4 using the forensic slice 120-2.

For example, resources need not be focused on monitoring the legitimate UEs 110 that are determined to be not compromised. The system 200 may allocate all or a portion of the resources (e.g., compute resources) that were previously used with respect to the original slice 120-1 to the forensic slice 120-2 for use with the monitoring and forensic analyses tools 242 with respect to the illegitimate UEs 110-4. Accordingly, resources may be temporarily increased for the forensic slice 120-2.

By way of example, the system 200 may adaptively make optimal use of infrastructure resources, maximizing resources addressing compromised UEs 110-4 in the sandbox, forensic environment. The system 200 may minimize and/or otherwise lower usage of infrastructure resources in the environment corresponding to the slice(s) 120-1 servicing the legitimate UEs 110. In some examples, the system 200 may increase storage for one slice (e.g., the forensic slice 120-2), while decreasing storage for one or more other slices (e.g., the legitimate slice 120-1 serving the uncompromised UEs 110). For instance, the adaptive resource allocation may include adapting allocation from allocation X GBs to each slice to allocations of Y GBs to the legitimate slice 120-1 and Z GBs to the forensic slice 120-2, where $Y<Z$ and $Y+X<2X$.

Such reallocation of resources from legitimate users to illegitimate users, and from one slice to another slice, may be time-limited such that the reallocation is a function of time. In some embodiments, the reallocation may only exist for a predetermined amount of time, after which resources may again be reallocated automatically to monitor the legitimate UEs 110 on the respective slice as well. For some embodiments, the reallocation may only exist/endure as long as the forensic analyses are continued with respect to the illegitimate UEs 110-4 on the forensic slice 120-2. In such instances, the resources may again be reallocated automatically to monitor the legitimate UEs 110 of their respective slice 120-1.

Similarly, the reassignment of compromised UEs 110 to a forensic slice 120-2 may be time-limited. It is not always the user that was malicious. It could be the device that is malicious. The device could be used as a proxy for the attack, caused by another remote device. The device that is currently attacking the network 120 may not be attacking the network 120 tomorrow. After the system 200 concludes its forensic analyses of one or more of the compromised UEs 110-4 and determines that a particular UE 110 no longer poses a threat (e.g., based at least in part on observed operations of the particular UE 110), and, in some embodiments, after an additional buffer time period (e.g., of X minutes, hours, days, etc.), the particular UE 110 may be reassigned from the forensic slice 120-2 to another slice 120-1. In some embodiments, the particular UE 110 may be reassigned to its original slice 120-1. In some embodiments, the particular UE 110 may be reassigned to a new slice, which could be a temporary slice as a staging slice, where the UE 110 may be heavily monitored while it is operating with the temporary slice for a probational time period to ensure that the UE 110 is no longer used for malicious operations. Accordingly, each temporary slice could be a staging slice that allows for probational operations of one or more previously compromised UEs 110 without affecting other slices. If, for the probational time period, no further malicious operations by the UE 110 are detected, the system 200 may determine that it is no longer a threat and may again reassign the UE 110 to another slice. In some embodiments, the UE 110 may be reassigned to its original slice after having been confirmed as no longer compromised.

In various embodiments, where the forensic slice 120-2 is not the original slice (e.g., slice A), the forensic slice 120-2 (e.g., slice B) may be newly created with a replicated or partially replicated configuration of the original slice, with all the services of the original slice or with exceptions. For example, the system 200 may identify as exceptions or more types of services that were used to compromise the original slice and/or that were used by the compromised UEs 110-4 as one or more vectors for the attack. Thus, in some embodiments, only a subset of the original services from the original slice (that may be configured to SLA specifications) may be replicated in the forensic slice 120-2 (e.g., only replicate services A and B, and not service C). For example, if voice is being compromised by a given DDOS attack, the new slice may not include voice (at least temporarily) but may include other services, such as data, a specific data server, AR/VR services, IOT services, SMS, etc. As another example, if a worm is sent via SMS with a selectable link to infect one or more devices, the new slice may not include SMS (at least temporarily) but may include other services. Likewise, other exceptions and combinations of services may be effected by the system 102 as a function of the services compromised by the attack. Accordingly, some embodiments may replicate the original services except for one or more types of services that may be compromised. In so doing, the system 102 may perform more analyses on the other services before bringing the compromised service online for further analysis. For example, the virus of the worm may be spreading (e.g., slowly) to affect more users. Initially, N users could be affected. If allowed to continue, N+ could be affected. So, the system 200 may be configured to postpone the affected service to stop spread, at least initially.

In some examples, the modeling engine 238 may collect attributes of a compromised service, attributes of UEs 110 using the service, corresponding traffic, QOS parameters, and/or the like and apply machine-learning and modeling to determine when to enable the compromised service (e.g., enable the service now, after a certain period of time, or upon detection of certain conditions that may, for example, correspond to detection that SMS has full protection with no worm and no virus attacks). The pattern and modeling detection may be a result of a feedback loop that incorporates previous forensic analyses results 225. The decision-making by the system 200 may be based at least in part on historical forensic analyses results, external forensic analyses results, lateral forensic analyses results, and/or the like to develop a model 225.

The system 200 may determine a velocity metric of a given attack. The velocity metric may correspond to a measure of how static or dynamic the attack propagation from one or more UEs 110-4 to one or more other UEs 110-4. When the system 200 determines (e.g., based at least in part on the velocity metric) that the attack is more static (e.g., satisfying a low-velocity threshold that is indicative of a static attack), the system 102 may configure the new slice to provide a full replication of the original services. However, when the system 200 determines that the attack is more dynamic and/or uncertain (e.g., based at least in part on the velocity metric with respect to the attack propagation and corresponding compromised service(s) and/or when there is insufficient data that does not meet a minimum data threshold to establish a velocity metric with sufficient certainty), the system 200 may configure the new slice 120-2 with exceptions of the compromised services.

Accordingly, the system 200 may use decision-making logic based at least in part on pattern detection and machine learning to determine if and/or when compromised services are again enabled. Such adaptation, along with the other adaptive features of the system 200, may accelerate the time needed to address attacks. For example, rather than simply following rules of thumb that, say, a service is going to be kept down for X hours, much less time may be needed to keep the service down. Say the system 200 learns enough about a particular worm or virus, based at least in part on crawling external database systems or otherwise pulling information from external data source systems and incorporating the information into its analyses, to determine that the worm or virus is not going to get activated after three minutes, the system 200 may enable the service again after Y minutes. Likewise, the system 200 may, in some embodiments, actively eradicate a threat such as a virus or worm at least in part by automatically identifying (e.g., by querying or crawling external data sources, software repositories, and systems) and obtaining anti-malware removal software, then installing and executing the remediation software on the compromised UEs 110-4. The system 200 may further conduct forensic analyses and monitoring to ensure that the threat has been removed, and, after confirming threat removal, may determine to enable services.

In a similar manner, the adaptive features may accelerate error correction of the system's determinations. For example, as the system 200 further models the particular threat, the system 200 may further refine the threat signature 226. When the system 200 further develops the threat signature 226, the system 200 may reassess in real time its prior designations of threat scores and UEs 110 as compromised, not compromised or otherwise along a threat categorization scale. As a result, the system 200 may determine that some legitimate UEs 110 were moved to the forensic slice 120-2 and/or that some compromised UEs 110-4 were not previously identified. The system 200 may employ corrective measures to correct its prior designations and reassign the newly designated UEs 110 accordingly (e.g., transition now-identified-legitimate UEs 110 from the forensic slice 120-2 to the other slice 120-1 and/or transition now-identified-compromised UEs 110 from the other slice 120-1 to the forensic slice 120-2). These are merely a few examples of the adaptive measures that the system 200 may employ in the processes of addressing a threat, analyzing the forensic slice 120-2 and associated UEs 110-4 and operations thereof, particularized modeling of the threat based at least in part on the analyses results, observation data 227, and an additional data collections, continuous monitoring of the slices, feedback loops and ongoing corrective measures, pattern recognition and historical forensic, and/or the like which the system 200 may employ in real time to accelerate the time needed to address threats with particularized processes and to increase efficiency of resource allocation and use particularized to the threats.

Additionally, various embodiments of the system 200 may handle the UEs 110 differently, depending on the threat scores and/or categorizations of the UEs 110. For example, in some embodiments, the system 200 may create multiple forensic slices 120-2 for a given security event rather than spinning up a single forensic slice 120-2 for each security event. When the system 200 identifies security events where there varying degrees of certainty with regard to whether a UE 110 and/or operations of the UE 110 are malicious, the system 200 may utilize multiple forensic slices 120-2 for the security event, where UEs 110 with strong identifications as being compromised may be relegated to one particular forensic slice 120-2, while UEs 110 with weaker identifications may be relegated to one or more other forensic slices 120-2 according to their scores and/or categorizations. The multiple forensic slices 120-2 may have different configurations in some embodiments. For example, the forensic slice 120-2 for the UEs 110-4 with strong identifications may have one or more exceptions as to services provided with the forensic slice 120-2 (e.g., one or more compromised services as disclosed herein), or as the other forensic slices for the UEs 110 with weaker identifications may have fewer exceptions or no exceptions according to their scores and/or categorizations. In this manner, the system 200 may fully isolate compromised UEs 110-4 and possibly compromised UEs 110 from legitimate UEs 110, while attempting to provide full services to those UEs 110 that a relatively more weakly identified as being compromised.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations may provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed:

1. A method to facilitate cellular network security, the method comprising:

receiving, by a cellular network control system, one or more communications corresponding to requested network access from an external entity distinct from an entity operating a cellular network and the cellular network control system;

generating, by the cellular network control system, configuration specifications to instantiate one or more network slices conforming to one or more network access parameters, one or more network entities, and/or one or more location identifiers;

instantiating, by the cellular network control system, the one or more network slices in accordance with the configuration specifications with network access provided to user equipment of the external entity, the cellular network consequently providing the network access to the user equipment of the external entity;

identifying, by the cellular network control system, one or more signals corresponding to detection of a security event mapped to network traffic of the one or more network slices of the cellular network, where the network traffic corresponds to one or more communications from some of the user equipment that are detected as malicious traffic;

determining, by the cellular network control system, a first subset of the user equipment using the one or more network slices to be compromised user equipment based at least in part on the security event; and transitioning, by the cellular network control system, the first subset of the user equipment or a second subset of the user equipment from the one or more network slices to one or more additional network slices, where, after the transitioning, one of the one or more network slices or the one or more additional network slices corresponds to one or more forensic slices that provide access to the first subset of the user equipment with an isolated environment that is isolated from the other of the network slices or the one or more additional network slices.

2. The method to facilitate cellular network security as recited in claim 1, the method further comprising:
controlling, by the cellular network control system, the one or more forensics slices to allow the first subset of the user equipment to at least partially continue to operate within the isolated environment.

3. The method to facilitate cellular network security as recited in claim 2, the method further comprising:
collecting, by the cellular network control system, operational data from the one or more forensics slices over time, the operational data corresponding to observation data observed by the cellular network control system about operations of the first subset of the user equipment within the isolated environment.

4. The method to facilitate cellular network security as recited in claim 3, the method further comprising:
analyzing, by the cellular network control system, the operational data from the one or more forensics slices to generate or change one or more models of the first subset of the user equipment and/or the second subset of the user equipment.

5. The method to facilitate cellular network security as recited in claim 4, the method further comprising:
analyzing, by the cellular network control system, the operational data from the one or more forensics slices to generate or change one or more models of the security event.

6. The method to facilitate cellular network security as recited in claim 5, the method further comprising:
instantiating, by the cellular network control system, the one or more additional network slices.

7. The method to facilitate cellular network security as recited in claim 6, wherein the instantiating of the one or more additional network slices is responsive to the security event.

8. A system to facilitate cellular network security, the system comprising:
one or more processing devices; and
memory communicatively coupled with and readable by the one or more processing devices and having stored therein processor-readable instructions which, when executed by the one or more processing devices, cause the one or more processing devices to perform operations comprising:
processing one or more communications corresponding to requested network access from an external entity distinct from an entity operating a cellular network and the system;
generating configuration specifications to instantiate one or more network slices conforming to one or more network access parameters, one or more network entities, and/or one or more location identifiers;
instantiating the one or more network slices in accordance with the configuration specifications with network access provided to user equipment of the external entity, the cellular network consequently providing the network access to the user equipment of the external entity;
identifying one or more signals corresponding to detection of a security event mapped to network traffic of the one or more network slices of the cellular network, where the network traffic corresponds to one or more communications from some of the user equipment that are detected as malicious traffic;
determining a first subset of the user equipment using the one or more network slices to be compromised user equipment based at least in part on the security event; and
transitioning the first subset of the user equipment or a second subset of the user equipment from the one or more network slices to one or more additional network slices, where, after the transitioning, one of the one or more network slices or the one or more additional network slices corresponds to one or more forensic slices that provide access to the first subset of the user equipment with an isolated environment that is isolated from the other of the network slices or the one or more additional network slices.

9. The system to facilitate cellular network security as recited in claim 8, the operations further comprising:
controlling the one or more forensics slices to allow the first subset of the user equipment to at least partially continue to operate within the isolated environment.

10. The system to facilitate cellular network security as recited in claim 9, the operations further comprising:
collecting operational data from the one or more forensics slices over time, the operational data corresponding to observation data observed about operations of the first subset of the user equipment within the isolated environment.

11. The system to facilitate cellular network security as recited in claim 10, the operations further comprising:
analyzing the operational data from the one or more forensics slices to generate or change one or more models of the first subset of the user equipment and/or the second subset of the user equipment.

12. The system to facilitate cellular network security as recited in claim 11, the operations further comprising:
analyzing the operational data from the one or more forensics slices to generate or change one or more models of the security event.

13. The system to facilitate cellular network security as recited in claim 12, the operations further comprising:
instantiating the one or more additional network slices.

14. The system to facilitate cellular network security as recited in claim 13, wherein the instantiating of the one or more additional network slices is responsive to the security event.

15. One or more non-transitory, machine-readable media having machine-readable instructions thereon which, when executed by one or more processing devices, cause the one or more processing devices to perform operations comprising:
processing one or more communications corresponding to requested network access from an external entity distinct from an entity operating a cellular network and the one or more processing devices;
generating configuration specifications to instantiate one or more network slices conforming to one or more network access parameters, one or more network entities, and/or one or more location identifiers;

instantiating the one or more network slices in accordance with the configuration specifications with network access provided to user equipment of the external entity, the cellular network consequently providing the network access to the user equipment of the external entity;

identifying one or more signals corresponding to detection of a security event mapped to network traffic of the one or more network slices of the cellular network, where the network traffic corresponds to one or more communications from some of the user equipment that are detected as malicious traffic;

determining a first subset of the user equipment using the one or more network slices to be compromised user equipment based at least in part on the security event; and transitioning the first subset of the user equipment or a second subset of the user equipment from the one or more network slices to one or more additional network slices, where, after the transitioning, one of the one or more network slices or the one or more additional network slices corresponds to one or more forensic slices that provide access to the first subset of the user equipment with an isolated environment that is isolated from the other of the network slices or the one or more additional network slices.

16. The one or more non-transitory, machine-readable media as recited in claim 15, the operations further comprising:

controlling the one or more forensics slices to allow the first subset of the user equipment to at least partially continue to operate within the isolated environment.

17. The one or more non-transitory, machine-readable media as recited in claim 16, the operations further comprising:

collecting operational data from the one or more forensics slices over time, the operational data corresponding to observation data observed by the one or more processing devices about operations of the first subset of the user equipment within the isolated environment.

18. The one or more non-transitory, machine-readable media as recited in claim 17, the operations further comprising:

analyzing the operational data from the one or more forensics slices to generate or change one or more models of the first subset of the user equipment and/or the second subset of the user equipment.

19. The one or more non-transitory, machine-readable media as recited in claim 18, the operations further comprising:

analyzing the operational data from the one or more forensics slices to generate or change one or more models of the security event.

20. The one or more non-transitory, machine-readable media as recited in claim 19, the operations further comprising:

instantiating the one or more additional network slices.

* * * * *